March 12, 1929.   C. S. SMITH   1,704,843
ELECTRICALLY WELDED TORSION RESISTING CROSS BAR
Filed Aug. 8, 1925
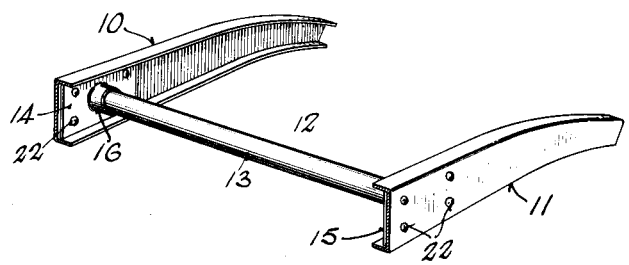
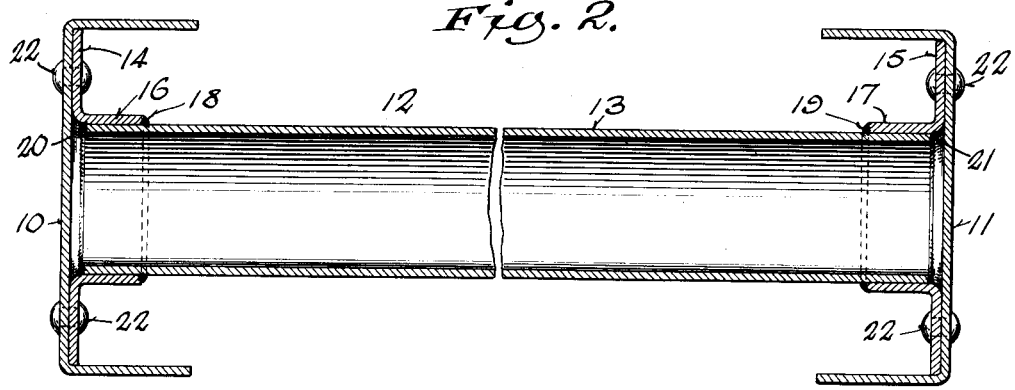
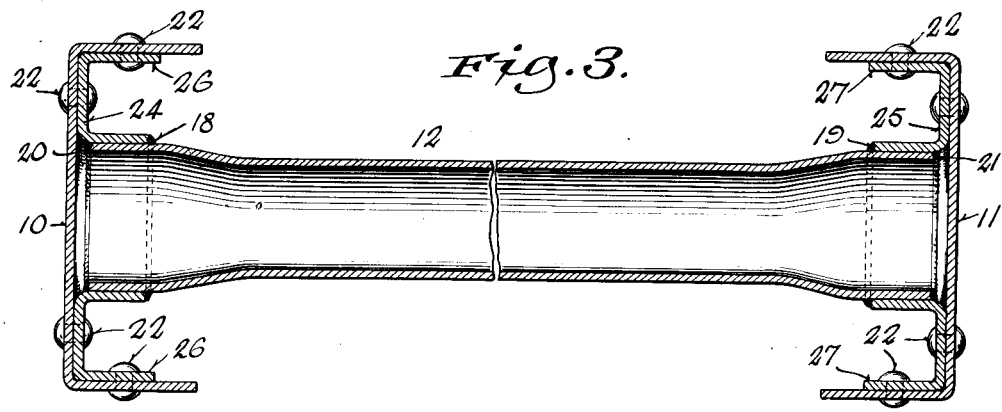
WITNESS:
Fred Palm
DEL.
INVENTOR.
CHARLES S. SMITH
BY
Erwin, Wheeler & Woolard
ATTORNEYS.

Patented Mar. 12, 1929.

1,704,843

UNITED STATES PATENT OFFICE.

CHARLES S. SMITH, OF MILWAUKEE, WISCONSIN, ASSIGNOR TO A. O. SMITH CORPORATION, OF MILWAUKEE, WISCONSIN, A CORPORATION OF NEW YORK.

ELECTRICALLY-WELDED TORSION-RESISTING CROSS BAR.

Application filed August 8, 1925. Serial No. 49,004.

My invention relates to torsion resisting cross bars for automobile and other vehicle frames, and it resides in a construction embodying a central tubular section having transversely disposed end plates welded to the opposite ends thereof so as to produce an integral structure, the end plates constituting the means through which the cross bar may be attached to the side bars of the frame. The side bars are usually formed as channels, the end plates of the cross bar being entered in the channels and secured to the side bars to form a permanent structure.

The transversely disposed end plates of the cross bar each have on one side thereof a tubular boss formed by drawing the metal of the plate outwardly in such manner that the circular wall constituting the boss extends laterally from the side of the plate in substantial parallelism with the axis of central section of the cross bar, and so forms a tube of even diameter.

The ends of the central tubular section of the cross bar are of uniform diameter for a length equal at least to the longitudinal depth of the opening in the tubular boss. The external diameter of the ends of the central section and the internal diameter of the bosses formed on the end plates, are substantially the same, it being my purpose in the construction to have the parts so proportioned that when the end of the central section is inserted in the boss, the parts are engaged with a driving, telescoping fit on somewhat extended parallel lines. An end plate is applied in this manner to each end of the central section, and the assembly completed by forcing the end plates into proper position with relation to the central section. The driving, telescoping fit of the parts will cause them to remain in their positions of assembly by reason of the friction exerted upon the surfaces thereof.

When so assembled, the constituent parts of the cross bar are arc welded into an integral structure of more than ordinary strength and torison resisting capacity. This result is effected by arc welding the free end of the boss to the central tubular section by passing a welding arc circumferentially and exteriorly of the latter in the angle formed by the free end of the boss and the central section. The end of the central section in like manner is arc welded to the boss by passing a welding arc circumferentially and interiorly of the latter in the angle there formed.

This double weld between the central section and the end plates greatly increases the strength of the union between the parts and produces an integral structure possessing a larger degree of resistance to the torsional strains to which the cross bars are subjected. The automobile frame in which cross bars so constructed are embodied, is thus maintained against deflection when the car is unevenly loaded or bad road conditions are encountered in operation.

The invention also resides in the manner of forming the parts and of uniting them so as to produce the integral structure described.

The novel features of the invention are pointed out in the appended claims.

In the accompanying drawing:

Figure 1 is a perspective view of one end of an automobile or other vehicle frame showing the manner in which a cross bar constructed in accordance with my invention is incorporated therein.

Fig. 2 is an enlarged vertical sectional view longitudinally of the cross bar showing details of the construction.

Fig. 3 is a like view of a modification in which reside some advantages in the way of increased strength and resistance, as will be hereinafter described.

In the drawing, the numerals 10 and 11 indicate the channel side bars of an automobile or other vehicle frame. Such side bars are drawn from strips of sheet steel, and are connected by suitable cross bars 12, one of which is shown, so as to constitute a rigid and permanent structure.

The cross bar 12, in the present instance, is constituted of a central tubular member 13 with end plates 14 and 15 united to its opposite ends by arc welding so as to form an integral structure. The end plates are provided upon one side with tubular bosses 16 and 17, such bosses being formed by displacing the metal of the plates laterally so as to form tubular portions of uniform diameter. In forming the boss, a central area of the plate is punched out so as to remove surplus metal and facilitate the drawing of the open ended tubular boss thereon.

Ordinarily, the central section 13 will be a tube of a diameter that is uniform throughout its length. The end plates are applied to the opposite ends of the central section by entering the ends of the central section in the bosses 16 and 17, as illustrated in Fig. 2. The inside diameter of the bosses and the outside diameter of the central section should be so proportioned that the meeting surfaces of the parts engage each other with a driving fit, so that when the bosses are placed upon the ends of the central section, the parts will retain their assembled positions by the friction of the engaged surfaces, and be free from accidental displacement due to rough handling.

When so assembled, the central tubular section and the end plates are placed in a welding jig, and by means of an arcing current the free ends of the bosses will be welded to the central tube, as at 18 and 19, by passing an arcing current circumferentially and exteriorly of the central section, so as to produce a welded line having a length equal to the circumference of the central tubular section. This manner of welding the parts produces a very strong structure, but it adds to the stability of the frame to perform a further welding operation in which the end of the tube is welded to the base of the boss, as at 20 and 21, and in the plane of the end plate, by passing an arc welding current circumferentially and interiorly of the boss, thus increasing by 100 per cent the strength of the union between the end plate and the central tubular section.

The end plates 14 and 15 at the opposite ends of the central section 13 are placed in the channels of the side bars 10 and 11 and united or attached thereto by any suitable means, as rivets 22, so as to produce a permanent structure. The width of the end plates should correspond with the distance between the flanges of the side bar, so that by engaging the flanges with their longer sides, a leverage is created which will resist any shearing strains which may be imposed upon the rivets in the operation of the vehicle of which the frame is a part.

It is not necessary in all cases that the central tubular section be of uniform diameter, but such central section intermediate its ends may be reduced in diameter as compared with the diameter of its enlarged ends, as is shown in Fig. 3. In the modification of the device as so constructed, the length of the welded line exceeds the circumference of the tubular central section at the points subjected to greatest torsional strains. By this means stability of the structure is increased.

In the construction illustrated in Fig. 3, the end plates may be formed as shoes, indicated 24 and 25, having upon their longer sides inturned flanges 26 and 27, which are adapted to be placed between and engage the flanges of the side bars and interpose a greater resistance of the torsional strains to which the vehicle frame may be subjected in operation.

The manner hereinbefore described of joining the end plates to the ends of the central tubular section enables me to produce a frame structure of great rigidity, and which will resist the torsional strains upon the cross bars, when the automobile in which the frame is incorporated is unevenly loaded or when it is passing over poorly surfaced roads. As a result, the frame is maintained in the plane in which it is constructed, and distortion of the frame with injury to the parts supported thereon is prevented.

The arc welding method which I prefer to use is known as the "metallic arc" process, in which the welding current is conducted by a destructible weldrod, which latter as it is fused by the arc, contributes additional welding material which in its fused state is deposited upon the joint and incorporated in the line of the weld.

Having thus described my invention, what I claim and desire to secure by Letters Patent of the United States, is:

1. In an automobile frame, a torsion resisting cross bar comprising a central tubular section, in combination with two transversely disposed end plates each of the latter having a tubular boss opening through the plate and projecting at one side thereof, with the ends of the central section entered in the bosses, the outer free end of the boss being welded to the central section circumferentially and exteriorly of the latter, and the end of the central section being welded to the boss circumferentially and interiorly at the base of the latter.

2. In an automobile frame, a torsion resisting cross bar comprising a central tubular section, in combination with two transversely disposed end plates each of the latter having a tubular boss opening through the plate and projecting at one side thereof, the said bosses receiving the ends of the central section with a driving fit, the free end of the bosses being welded to the central section circumferentially and exteriorly of the latter, and the ends of the central section being welded to the bosses circumferentially and interiorly at the base of the latter.

3. In an automobile frame, a torsion resisting cross bar comprising a central tubular section having enlarged ends, in combination with two transversely disposed end plates each of the latter having a tubular boss projecting from the plate to one side thereof, with the ends of the central section entered in the bosses, the free end of the bosses being welded to the central section circumferentially and exteriorly of the latter, and the ends of the central section being welded to the bosses circumferentially and interiorly at the base of the latter.

In testimony whereof, I have signed my name at Milwaukee, this 5th day of August, 1925.

C. S. SMITH.